(12) United States Patent
Miyoshi

(10) Patent No.: US 7,615,387 B2
(45) Date of Patent: Nov. 10, 2009

(54) ADDITION CURING SILICONE COMPOSITION CAPABLE OF PRODUCING A CURED PRODUCT WITH EXCELLENT CRACK RESISTANCE

(75) Inventor: Kei Miyoshi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 379 days.

(21) Appl. No.: 11/534,694

(22) Filed: Sep. 25, 2006

(65) Prior Publication Data

US 2007/0073026 A1    Mar. 29, 2007

(30) Foreign Application Priority Data

Sep. 26, 2005   (JP) .............................. 2005-278352

(51) Int. Cl.
*H01L 21/00* (2006.01)
(52) U.S. Cl. ........................... 438/22; 428/447; 528/10; 528/12; 528/31; 528/32; 528/33; 528/43
(58) Field of Classification Search ................... 528/15, 528/10, 12, 31–33, 43; 428/447; 438/22
See application file for complete search history.

(56) References Cited

U.S. PATENT DOCUMENTS

| | | | | |
|---|---|---|---|---|
| 5,714,265 | A * | 2/1998 | Meguriya et al. | ............ 428/413 |
| 7,282,270 | B2 * | 10/2007 | Morita et al. | ................ 428/447 |
| 2001/0053840 | A1 | 12/2001 | Ko et al. | |
| 2002/0161140 | A1 | 10/2002 | Yoneda et al. | |
| 2004/0116640 | A1 | 6/2004 | Miyoshi | |

FOREIGN PATENT DOCUMENTS

| | | | |
|---|---|---|---|
| JP | 3344286 | 8/2002 | |
| WO | WO0233011 | * | 4/2002 |

OTHER PUBLICATIONS

U.S. Appl. No. 11/461,895, filed Aug. 2, 2006, Yamakawa, et al.

* cited by examiner

*Primary Examiner*—Randy Gulakowski
*Assistant Examiner*—Olatunde S Ojurongbe
(74) *Attorney, Agent, or Firm*—Oblon, Spivak, McClelland, Maier & Neustadt, L.L.P.

(57) ABSTRACT

Provided is a silicone composition, including: (A) an organopolysiloxane represented by an average composition formula $R^1{}_n SiZ_{[(4-n)/2]}$ (in which, $R^1$ represents a monovalent hydrocarbon group, an alkoxy group or a hydroxyl group, provided that from 5 to 50 mol % of all $R^1$ groups are alkenyl groups, and from 10 to 80 mol % of all $R^1$ groups are aryl groups, Z represents an oxygen atom or a bivalent hydrocarbon group, provided at least 80 mol % of all Z groups are oxygen atoms, and n is a number that satisfies 1=n<2), in which from 5 to 50 mol % of all silicon atoms exist within structures represented by an average formula: —$SiR^2{}_2$—X—$(SiR^2{}_2 O)_l SiR^2{}_2$—X—$SiR^2{}_2 O$— (in which, $R^2$ represents a monovalent hydrocarbon group, provided that from 10 to 80 mol % of all $R^2$ groups are aryl groups, X represents an oxygen atom or a bivalent hydrocarbon group, and l represents an integer of 3 or greater), (B) an organohydrogenpolysiloxane having at least 2 SiH groups within each molecule, and (C) an addition reaction catalyst. The composition is capable of producing a cured product with a high degree of hardness and excellent crack resistance. The composition is useful as a sealing material and an adhesive.

19 Claims, No Drawings

ADDITION CURING SILICONE COMPOSITION CAPABLE OF PRODUCING A CURED PRODUCT WITH EXCELLENT CRACK RESISTANCE

CROSS REFERENCE TO RELATED APPLICATION

This claims priority of Japanese.Patent Application No. 2005-278352, filed on Sep. 26, 2005.

BACKGROUND OF THE INVENTION

1. Field of the Invention

The present invention relates to an addition curing silicone composition capable of producing a cured product with a high degree of hardness and excellent crack resistance.

2. Description of the Prior Art

Conventionally, compositions proposed as silicone compositions with favorable heat resistance and ultraviolet light resistance are used as the sealing materials for photodevices such as LEDs (see patent references 1 to 3). However, although all of these proposed compositions offer improved levels of durability to heat and ultraviolet light when compared with epoxy resins, when these silicone compositions are used for sealing a complex device, and are subjected to reflow conditions or temperature cycling between −40° C. and either 100° C. or 125° C., differences in the linear coefficient of expansion values for the structural materials of the photodevice can cause cracking, meaning the potential applications for these compositions are limited.

[Patent Reference 1] JP 3344286
[Patent Reference 2] US 2002/0161140 A1
[Patent Reference 3] US 2004/0116640 A1

SUMMARY OF THE INVENTION

Accordingly, the present invention has an object of providing an addition curing silicone composition capable of producing a cured product with a high degree of hardness and excellent crack resistance.

As a result of intensive efforts aimed at addressing the situation described above, the inventors of the present invention discovered that by incorporating a linear structure siloxane containing aryl groups as a straight-chain segment within a three dimensionally cross-linked organopolysiloxane containing aryl groups, the crack resistance could be improved with no reduction in the hardness of the cured product.

In other words, a first aspect of the present invention provides an addition reaction curing silicone composition, comprising:

(A) an organopolysiloxane in a liquid state with a viscosity at 25° C. of 10 mPa·s or greater or in a solid state, which is represented by an average composition formula (1) shown below:

$$R^1{}_n SiZ_{[(4-n)/2]} \qquad (1)$$

(wherein, each $R^1$ represents, independently, an unsubstituted or substituted monovalent hydrocarbon group, an alkoxy group or a hydroxyl group, provided that from 5 to 50 mol % of all $R^1$ groups are alkenyl groups, and from 10 to 80 mol % of all $R^1$ groups are aryl groups, Z represents an oxygen atom or a bivalent hydrocarbon group of 2 to 10 carbon atoms, provided at least 80 mol % of all Z groups are oxygen atoms, and n is a number that satisfies $1 \leq n < 2$), and in which from 5 to 50 mol % of all silicon atoms exist within structures represented by an average formula (2) shown below:

$$-SiR^2{}_2-X-(SiR^2{}_2O)_L SiR^2{}_2-X-SiR^2{}_2O- \qquad (2)$$

(wherein, each $R^2$ represents, independently, an unsubstituted or substituted monovalent hydrocarbon group, provided that from 10 to 80 mol % of all $R^2$ groups are aryl groups, X represents an oxygen atom or a bivalent hydrocarbon group of 2 to 10 carbon atoms, and L represents an integer of 3 or greater), (B) an organohydrogenpolysiloxane having at least 2 hydrogen atoms bonded to silicon atoms within each molecule and with a viscosity at 25° C. of no more than 1,000 mPa·s, represented by an average composition formula (3) shown below:

$$R^3{}_a H_b SiO_{[(4-a-b)/2]} \qquad (3)$$

(wherein, each $R^3$ represents, independently, an unsubstituted or substituted monovalent hydrocarbon group that contains no aliphatic unsaturated bonds, a is a number that satisfies $0.7 \leq a \leq 2.1$, and b is a number that satisfies $0.001 \leq b \leq 1.0$, provided that a+b represents a number that satisfies $0.8 \leq a+b \leq 3$), in sufficient quantity to provide from 0.7 to 5 mols of hydrogen atoms bonded to silicon atoms within the component (B) for every 1 mol of alkenyl groups bonded to silicon atoms within the component (A), and (C) an effective quantity of an addition reaction catalyst; and also provides the above composition further comprising an adhesion-imparting agent (D).

A second aspect of the present invention provides a cured product obtained by curing the above composition.

A third aspect of the present invention provides a sealing material comprising the above composition.

A fourth aspect of the present invention provides an adhesive comprising the above composition.

A fifth aspect of the present invention provides a process for sealing a photodevice with a cured product of the above sealing material, comprising the steps of:

applying said sealing material to said photodevice and
curing said sealing material to form said cured product on said photodevice.

A sixth aspect of the present invention provides a process for bonding two adherends with a cured product of the above adhesive, comprising the steps of:

sandwiching said adhesive between said adherends, and
curing said adhesive to form said cured product between said adherends.

A composition of the present invention is capable of producing a cured product that exhibits excellent durability (crack resistance) to cracking caused by distortions generated by the stresses of thermal shock, and also has a high degree of hardness similar to hard plastics. Moreover, in a preferred embodiment, the light transmittance of the cured product is also extremely superior. Accordingly, a composition of the present invention is particularly useful as a sealing material for photodevices such as LEDs, and is also useful as a lens material or hard coating agent or the like. Because a composition of the present invention has favorable self-adhesiveness, it is also useful as a high strength adhesive that exhibits excellent heat resistance.

DETAILED DESCRIPTION OF THE PREFERRED EMBODIMENTS

As follows is a detailed description of a composition of the present invention.

<(A) Organopolysiloxane>

An organopolysiloxane of the component (A) is the component that functions as the base polymer of the composition. The component (A) is an organopolysiloxane in a liquid state with a viscosity at 25° C. that is typically 10 mPa·s or greater or in a solid state, which is represented by an average composition formula (1) shown above, and in which from 5 to 50 mol %, and preferably from 10 to 40 mol %, of all the silicon atoms exist within structures represented by the average formula (2) shown above.

If the proportion of silicon atoms that exist within structures represented by the average formula (2) is less than 5 mol % of the total number of silicon atoms within the organopolysiloxane of the component (A), then favorable crack resistance may be unattainable, whereas if this proportion exceeds 50 mol %, then the composition develops extremely high viscosity and the degree of hardness deteriorates, meaning achieving the desired physical properties can become problematic.

The organopolysiloxane of the component (A) is typically a resin, and is more specifically a resin with a three dimensional network structure comprising mainly T units (trifunctional siloxane units) and/or Q units ($SiO_{4/2}$ units), which also includes straight-chain structures comprising mainly D units (bifunctional siloxane units).

In the above average composition formula (1), the monovalent hydrocarbon group represented by $R^1$ is typically a group of 1 to 15, and preferably from 1 to 10, carbon atoms, and specific examples include alkyl groups such as a methyl group, ethyl group, propyl group, isopropyl group, isobutyl group, tert-butyl group, butyl group, pentyl group, or hexyl group; cycloalkyl groups such as a cyclohexyl group; bicycloalkyl groups such as a norbornyl group; alkenyl groups such as a vinyl group, allyl group, propenyl group, isopropenyl group, or butenyl group; aryl groups such as a phenyl group; and groups in which the hydrogen atoms within these groups have been substituted with a halogen atom or the like, such as a trifluoropropyl group, although of these, a methyl group, ethyl group, cyclohexyl group, norbornyl group, vinyl group, phenyl group or trifluoropropyl group is preferred. The alkoxy group represented by $R^1$ is typically a group of 1 to 8, and preferably from 1 to 3, carbon atoms, and specific examples include a methoxy group or ethoxy group.

In the above average composition formula (1), from 5 to 50 mol % of all the $R^1$ groups must be alkenyl groups, and this proportion of alkenyl groups is preferably from 5 to 40 mol %, and even more preferably from 10 to 30 mol %. If the quantity of alkenyl groups is less than 5 mol %, then the cured product may not have an adequate cross-linking density, causing a marked fall in the hardness at high temperatures, and making it difficult to achieve the desired physical properties. If the quantity of alkenyl groups exceeds 50 mol %, then the quantity of the component (B) that must be added increases, meaning the proportion of the three dimensionally cross-linked organopolysiloxane decreases, which may make achieving the desired physical properties impossible.

In the above average composition formula (1), from 10 to 80 mol % of all the $R^1$ groups must be aryl groups, and this proportion of aryl groups is preferably from 25 to 70 mol %, and even more preferably from 30 to 60 mol %. If the quantity of aryl groups is less than 10 mol %, then the cured product may become brittle, making the desired physical properties unattainable. If the quantity of aryl groups exceeds 80 mol %, then the viscosity of the organopolysiloxane increases significantly, which can lead to a dramatic deterioration in the workability of the composition.

In the above average composition formula (1), at least 80 mol % (namely, from 80 to 100 mol %), preferably from 90 to 100 mol %, and even more preferably from 95 to 99.9 mol % of all the Z groups are oxygen atoms. The remaining Z groups, which represent no more than 20 mol % (namely, from 0 to 20 mol %), preferably from 0 to 10 mol %, and even more preferably from 0.1 to 5 mol %, are bivalent hydrocarbon groups.

In the average composition formula (1), the bivalent hydrocarbon group represented by Z must contain from 2 to 10 carbon atoms, and preferably contains from 2 to 6 carbon atoms, and specific examples of suitable groups include alkylene groups such as an ethylene group, trimethylene group, propylene group, methylethylene group, or tetramethylene group; cycloalkylene groups such as a cyclohexylene group; and arylene groups such as a phenylene group, and of these, an ethylene group, propylene group, phenylene group or cyclohexylene group is preferred.

In the average composition formula (1), n must be a number that satisfies $1 \leq n < 2$, and is preferably a number within a range from 1.1 to 1.9.

In the organopolysiloxane of the component (A), the structure represented by the above average formula (2) (namely, a structure comprising a straight-chain organosiloxane, an organosilalkylene or organosilarylene, or a combination thereof) generates soft segments within the organopolysiloxane, thereby markedly improving the crack resistance of the resulting cured product.

In the above average formula (2), the monovalent hydrocarbon group represented by $R^2$ is the same as the monovalent hydrocarbon group represented by $R^1$ that was described in relation to the above average composition formula (1), and examples of suitable groups include the same groups as those listed for $R^1$.

In the above average formula (2), from 10 to 80 mol %, preferably from 20 to 70 mol %, and even more preferably from 30 to 60 mol % of all $R^2$ groups are aryl groups. If this range is satisfied, then a dramatic improvement in durability (crack resistance) is realized. If the proportion of aryl groups is less than 10 mol %, then the properties achieved may be little different from those obtained with a composition containing no aryl groups. If the proportion of aryl groups exceeds 80 mol %, then synthesis becomes difficult, and the viscosity also increases significantly, which can lead to a deterioration in the workability of the composition.

In the above average formula (2), the bivalent hydrocarbon group represented by X is the same as the bivalent hydrocarbon group represented by Z that was described in relation to the above average composition formula (1), and examples of suitable groups include the same groups as those listed for Z.

In the above average formula (2), 1 must be an integer of 3 or greater, and is preferably an integer that falls within a range from 4 to 30, and even more preferably from 4 to 20. If l is less than 3, then the targeted action of the structure as a soft segment may be insufficient. If l is too large, then not only is synthesis difficult, but the hardness may also fall, meaning the desired high hardness material may not be obtainable.

Specific examples of the structure represented by the above average formula (2) include those structures shown below.

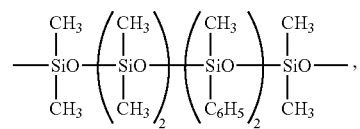

-continued

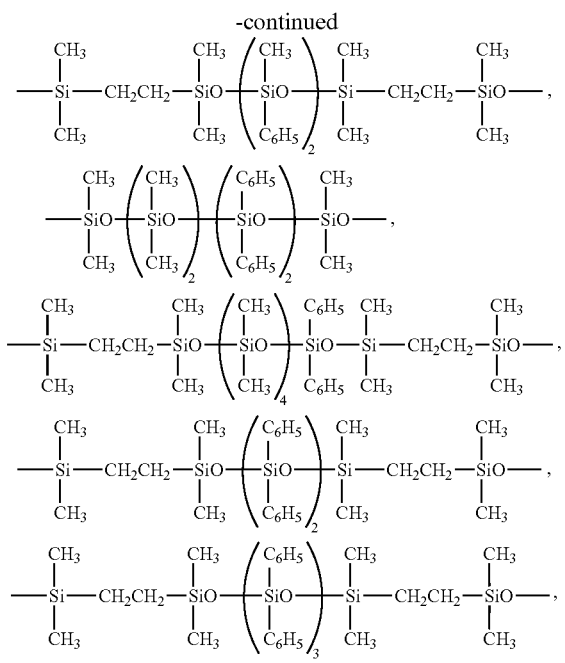

Specific examples of the organopolysiloxane of the component (A) include the compounds shown below:

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.07}[(C_6H_5)_2SiO_{2/2}]_{0.07}[(CH_3)_2SiO_{2/2}]_{0.06}$;

$[(C_6H_5)SiO_{3/2}]_{0.6}[(CH_2=CH)(CH_3)_2SiO_{1/2}]_{0.1}[(CH_3)_2SiO_{1/2}(C_2H_4)_{1/2}]_{0.1}[(C_6H_5)_2SiO_{2/2}]_{0.1}[(CH_3)_2SiO_{2/2}]_{0.1}$;

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.04}[(C_6H_5)_2SiO_{2/2}]_{0.02}[(CH_3)_2SiO_{2/2}]_{0.14}$;

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.08}[(C_6H_5)_2SiO_{2/2}]_{0.04}[(CH_3)_2SiO_{2/2}]_{0.08}$; and $[(C_6H_5)SiO_{3/2}]_{0.6}[(CH_2=CH)(CH_3)_2SiO_{1/2}]_{0.2}[(C_6H_5)_2SiO_{2/2}]_{0.07}[(CH_3)_2SiO_{2/2}]_{0.13}$ (wherein, within each of the above units, $(C_2H_4)$ represents a —$CH_2CH_2$— group).

The organopolysiloxane of the component (A) can generally be produced by a method in which a silicon compound containing a chlorine atom (typically, a chlorine atom that is bonded to a silicon atom) is subjected to hydrolysis-condensation, a method in which a silicon compound containing an alkoxy group is subjected to hydrolysis-condensation, or a method in which a silicon compound containing a chlorine atom (typically, a chlorine atom that is bonded to a silicon atom) and a silicon compound containing an alkoxy group are subjected to hydrolysis-condensation. Furthermore, a segment portion having a structure represented by the average formula (2) can be obtained by an equilibration reaction using an alkali or acid, or by an addition reaction between a silicon compound containing a hydrogen atom bonded to a silicon atom at both molecular chain terminals, and a silicon compound containing a group with an unsaturated bond (such as alkenyl group) bonded to a silicon atom at both molecular chain terminals.

The organopolysiloxane of the component (A) may be used either alone, or in combinations of two or more different compounds.

<(B) Organohydrogenpolysiloxane>

The organohydrogenpolysiloxane of the component (B) functions as a cross-linking agent that causes cross-linking of the component (A). The organohydrogenpolysiloxane of the component (B) is represented by the above average composition formula (3), contains at least 2, preferably from 2 to 100, even more preferably from 2 to 50, and most preferably from 2 to 15, hydrogen atoms bonded to silicon atoms within each molecule, has a viscosity at 25° C. of no more than 1,000 mPa·s, preferably from 0.5 to 500 mPa·s, and even more preferably from 0.9 to 100 mPa·s, and typically contains a number of silicon atoms within each molecule (or a polymerization degree) of 2 to 200, preferably from 3 to 100, and even more preferably from approximately 4 to 50. There are no particular restrictions on the structure of the organohydrogenpolysiloxane of the component (B), and typical examples of suitable structures include straight-chain or cyclic structures, structures in which a portion of such structures contain branch chains, and three dimensional network structures.

In the above average composition formula (3), the monovalent hydrocarbon group that contains no aliphatic unsaturated bonds represented by $R^3$ is typically a group of 1 to 20, and preferably from 1 to 10 carbon atoms, and specific examples of suitable groups include alkyl groups such as a methyl group, ethyl group, propyl group, butyl group, pentyl group, or hexyl group; cycloalkyl groups such as a cyclohexyl group; bicycloalkyl groups such as a norbornyl group; aryl groups such as a phenyl group; and groups in which a potion of these groups have undergone substitution, such as a trifluoropropyl group, glycidylpropyl group, or trimethoxysilylethyl group, although of these, a methyl group, ethyl group, cyclohexyl group, phenyl group, norbornyl group, glycidylpropyl group, or trimethoxysilylethyl group is particularly effective in terms of improving the compatibility with the organopolysiloxane of the component (A), and a phenyl group is particularly desirable. In those cases where the component (B) contains a phenyl group as the $R^3$ group, the ideal phenyl group quantity cannot be readily defined as it will vary depending on the aryl group content of the component (A), but generally, the proportion (mol %) of phenyl groups within the total number of $R^3$ groups in the component (B) is preferably similar to the proportion (mol %) of aryl groups within the total number of $R^1$ group in the component (A).

In the average composition formula (3), a must be a number that satisfies $0.7 \leq a \leq 2.1$ and is preferably a number that satisfies $0.9 \leq a \leq 2.0$, and b must be a number that satisfies $0.001 \leq b \leq 1.0$ and is preferably a number that satisfies $0.1 \leq b \leq 1$, although a+b must represent a number that satisfies $0.8 \leq a+b \leq 3$ and is preferably a number that satisfies $1.5 \leq a+b \leq 2.7$.

Specific examples of the organohydrogenpolysiloxane of the component (B) include 1,1,3,3-tetramethyldisiloxane, tris(dimethylhydrogensiloxy)methylsilane, tris(dimethylhydrogensiloxy)phenylsilane, cyclic siloxane compounds including alkylhydrogencyclosiloxanes such as tetramethyltetrahydrogencyclotetrasiloxane; straight-chain siloxane compounds such as those represented by the general formulas shown below:

Me$_3$SiO(SiMeHO)$_d$SiMe$_3$
Me$_3$SiO(SiMeHO)$_d$(SiMe$_2$O)$_e$SiMe$_3$
Me$_3$SiO(SiMeHO)$_d$(SiPh$_2$O)$_e$SiMe$_3$
Me$_3$SiO(SiMeHO)$_d$(SiPhMeO)$_e$SiMe$_3$
Me$_3$SiO(SiMeHO)$_d$(SiMe$_2$O)$_e$(SiPh$_2$O)$_f$SiMe$_3$
HMe$_2$SiO(SiMeHO)$_d$SiMe$_2$H
HMe$_2$SiO(SiMeHO)$_d$(SiMe$_2$O)$_e$SiMe$_2$H
HMe$_2$SiO(SiMeHO)$_d$(SiPh$_2$O)$_e$SiMe$_2$H
HMe$_2$SiO(SiMeHO)$_d$(SiMe$_2$O)$_e$(SiPh$_2$O)$_f$SiMe$_2$H (wherein, d represents an integer from 2 to 20 and preferably from 2 to 10, e represents an integer from 0 to 20 and preferably from 0 to 10, f represents an integer from 0 to 20 and preferably from 0 to 10, Me represents a methyl group, and Ph represents a phenyl group, and these abbreviations also apply below); branched siloxane compounds in which a portion of the above straight-chain siloxane compounds are substituted with $MeSiO_{3/2}$ units, $PhSiO_{3/2}$ units, $SiO_{4/2}$ units, or a combination of two or more such units; and organohydrogenpolysiloxane resins with a three dimensional network structure comprising $[HMe_2SiO_{1/2}]$ units and $[SiO_{4/2}$ units].

The blend quantity of the component (B) must be sufficient to provide from 0.7 to 5 mols, and preferably from 0.7 to 3.0 mols, and even more preferably from 0.8 to 2 mols, of hydrogen atoms bonded to silicon atoms (SiH groups) within the component (B) for every 1 mol of alkenyl groups bonded to silicon atoms within the component (A). If this quantity is less than 0.7 mols, then not only is the level of cross-linking inadequate, but unsaturated bonds also tend to remain within the cured product, and if this product is then exposed to high temperature it may undergo oxidation and yellowing, causing a deterioration in the external appearance. If the quantity exceeds 5 mols, then because the organohydrogenpolysiloxane of the component (B) itself acts as a soft segment, the desired high degree of hardness may not be achievable.

The organohydrogenpolysiloxane of the component (B) may be used either alone, or in combinations of two or more different compounds.

<(C) Addition Reaction Catalyst>

The addition reaction catalyst of the component (C) is used for promoting the reaction between the alkenyl groups within the component (A) and the hydrogen atoms bonded to silicon atoms within the component (B). Specific examples of suitable addition reaction catalysts of the component (C) include platinum, palladium and rhodium based catalysts, and in order to maximize catalyst efficiency, a platinum catalyst is usually used. Examples of commonly used platinum catalysts include chloroplatinic acid and compounds derived therefrom. Compounds in which substituents have been substituted with divinyltetramethyldisiloxane have minimal chlorine atom content, which can cause metal corrosion, and are consequently particularly suited to electrical and electronic applications.

There are no particular restrictions on the blend quantity of the addition reaction catalyst of the component (C), which need only be an effective catalytic quantity, and a typical quantity, calculated as the quantity of platinum (or palladium or rhodium) atoms relative to the component (A) (on a mass basis), is within a range from 0.1 to 500 ppm, and quantities from 3 to 100 ppm are preferred.

The addition reaction catalyst of the component (C) may be used either alone, or in combinations of two or more different compounds.

<Other Components>

A composition of the present invention comprising the components (A) through (C) usually exhibits a favorable level of self-adhesiveness to a variety of different substrates, but in those applications that require even better adhesion, an adhesion-imparting agent of a component (D) described below is also preferably added to the composition.

This component (D) is an adhesion-imparting agent that imparts superior self-adhesiveness to the composition of the present invention, and this self-adhesiveness should preferably be favorable with respect to metals and organic resins. Examples of this component (D) include organosilicon compounds such as silanes containing at least one, and preferably two or more, functional groups selected from the group consisting of alkenyl groups such as a vinyl group, an acryloyloxy group, methacryloyloxy group, hydrosilyl group (SiH group), epoxy group, alkoxy groups, a carbonyl group and a phenyl group, as well as cyclic or straight-chain siloxanes containing from 2 to 30, and preferably from approximately 4 to 20, silicon atoms.

The component (D) may be used either alone, or in combinations of two or more different compounds, and is typically added in a quantity of no more than 15 parts by mass (namely, from 0 to 15 parts by mass), and preferably from 0.5 to 10 parts by mass, per 100 parts by mass of the component (A), although in those cases where the component (D) contains hydrosilyl groups (SiH groups) within the molecule, the quantity added of the component (D) is preferably adjusted so that the molar ratio of the combined total of hydrogen atoms bonded to silicon atoms (SiH groups) within the component (B) and hydrogen atoms bonded to silicon atoms (SiH groups) within the component (D), for every 1 mol of alkenyl groups bonded to silicon atoms within the component (A), falls within a range from 0.7 to 5, and preferably from 0.8 to 2.

Specific examples of the component (D) include the compounds shown below.

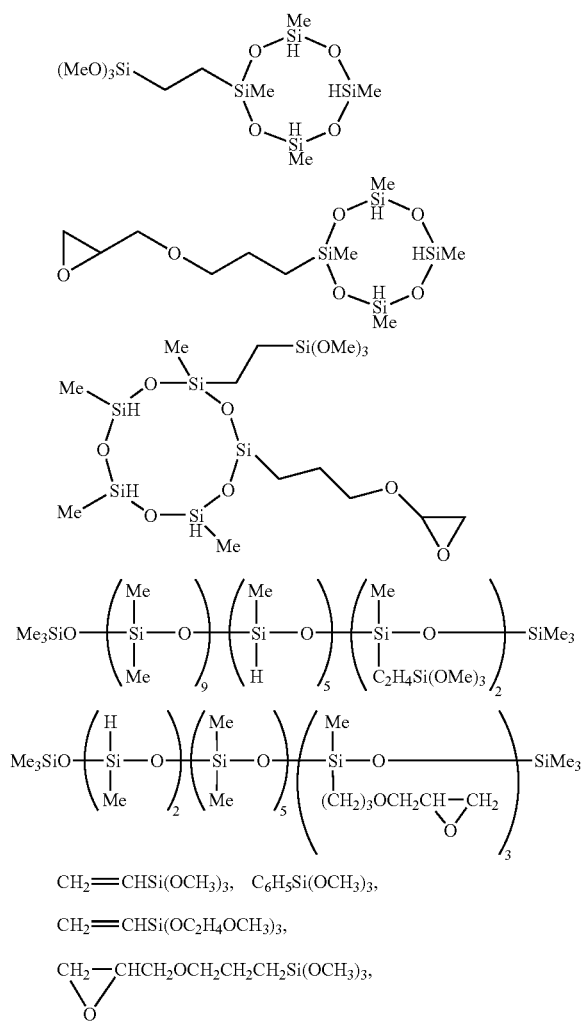

-continued

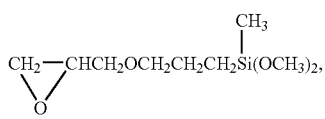

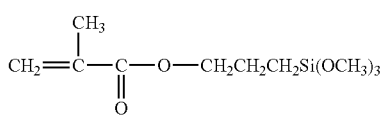

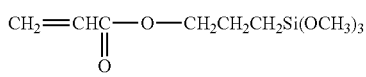

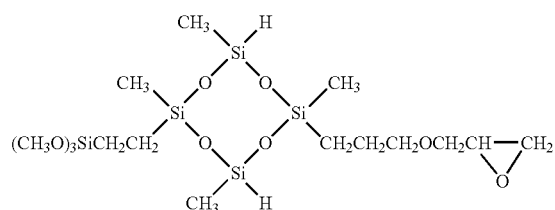

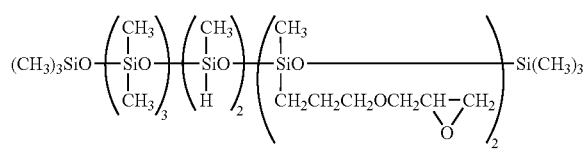

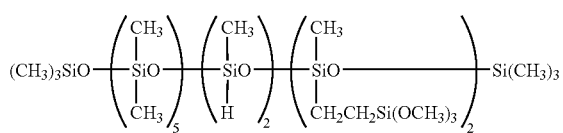

The composition of the present invention may also include other additives that impart specific functionality, provided the inclusion of such additives does not impair the desired properties of the composition. Examples of such additives include reaction retarders such as ethynylcyclohexanol; adhesion improvers such as carbon functional silanes that contain an epoxy group and/or alkoxysilyl group, or partial hydrolysis-condensation products thereof, or siloxane compounds; thixotropic imparting agents such as fumed silica (which may also include a polyether); conductivity imparting agents including metal powders of silver, copper or aluminum, and any of the various carbon forms; and color regulators such as dyes and pigments. These additives may also be used in combinations of two or more additives.

<Composition Preparation and Curing>

There are no particular restrictions on the method of preparing the composition, which is typically conducted by stirring and mixing together the aforementioned components (A) through (C), and any other optional components. The thus obtained composition can typically be cured by heating at 60 to 200° C. for a period of 10 minutes to 5 hours. Step curing, in which the composition is heated at 60 to 100° C. for 1 to 2 hours, and then at 120 to 200° C. for a further 1 to 5 hours, may also be used.

Preferred Embodiment

In applications involving a photodevice such as an LED (light emitting diode), photodiode, phototransistor or photocoupler, the transmittance of light in the infrared and visible spectra is critical, and in these types of applications, the refractive index and compatibility of each component has a significant effect on the transparency. Taking these factors into consideration, the composition of the present invention can be used to produce a cured product for which transmittance of light of wavelength 400 nm through the cured product in a sheet-like shape with a thickness of 2 mm is 80% or higher, and typically 85% or higher. The composition of the present invention can be used as a sealing material for sealing, for example, the above photodevice.

The composition of the present invention can also be used as an adhesive for bonding two adherends, for example, for bonding an inorganic material such as metallic silicon used as a silicon chip (die) and an organic resin such as a polyimide resin, a polyamideimide resin, and a polyamide resin used as a substrate or a packaging material.

EXAMPLES

As follows is a more detailed description of the present invention using a series of examples. The present invention, however, is in no way restricted by these examples. In the examples, the terms Me, Ph, and Vi represent a methyl group, phenyl group, and vinyl group respectively.

Synthesis Example 1

Synthesis of a Phenyl Group-Containing Straight-Chain Segment

To 100 g (0.38 mols) of a compound containing a hydrogen atom bonded to a silicon atom at both molecular chain terminals, represented by a structural formula shown below:

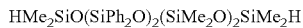

was added a toluene solution of a platinum catalyst containing divinyltetramethyldisiloxane ligands, in sufficient quantity to provide a quantity of platinum atoms (on a mass basis) of 5 ppm. The resulting toluene solution was heated to 90° C., and 48.3 g (0.40 mols) of vinyldimethylchlorosilane was then added dropwise and reacted. The resulting reaction solution was held at 90° C. for 5 hours, and then subjected to treatment under a reduced pressure of no more than 10 mmHg to remove the excess vinyldimethylchlorosilane, thereby yielding a straight-chain segment represented by a structural formula shown below.

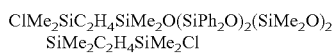

Synthesis Example 2

Synthesis of a Resin 1

Following mixing of 116.4 g (0.55 mols) of phenyltrichlorosilane, 24.1 g (0.2 mols) of vinyldimethylchlorosilane and 38.6 g of the straight-chain segment, the resulting mixture was added dropwise to a suspension of toluene and water, and a hydrolysis was performed. The resulting solution was then neutralized by washing with water, and the organic layer was extracted, 0.05 g of potassium hydroxide was added to this organic layer, and the mixture was stirred at reflux temperature for 10 hours to effect a condensation. Subsequently, trimethylchlorosilane was added to neutralize the reaction solution, excess toluene was removed by stripping under reduced pressure, and the solution was then filtered, yielding a toluene solution of a resin 1 with a non-volatile fraction of 50% by mass (and with an average composition formula:

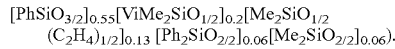

Synthesis Example 3

Synthesis of a Resin 2

In the synthesis example 2, with the exceptions of replacing the 116.4 g of phenyltrichlorosilane and the 38.6 g of the straight-chain segment with 127 g (0.6 mols) of phenyltrichlorosilane and 25.7 g of the straight-chain segment respectively, preparation in the same manner as the synthesis example 2 yielded a toluene solution of a resin 2 with a non-volatile fraction of 50% by mass (and with an average composition formula:

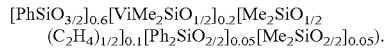

Synthesis Example 4

Synthesis of a Resin 3

In the synthesis example 2, with the exceptions of replacing the 24.1 g of vinyldimethylchlorosilane and the 38.6 g of the straight-chain segment with 18.1g (0.15 mols) of vinyldimethylchlorosilane and 32.1 g of the straight-chain segment respectively, preparation in the same manner as the synthesis example 2 yielded a toluene solution of a resin 3 with a non-volatile fraction of 50% by mass (and with an average composition formula:

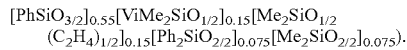

Synthesis Example 5

Synthesis of a Resin 4

In the synthesis example 2, with the exceptions of replacing the 24.1 g of vinyldimethylchlorosilane and the 38.6 g of the straight-chain segment with 28.2 (0.2 mols) of vinylmethyldichlorosilane and 32.3 g (0.25 mols) of dimethyldichlorosilane respectively, preparation in the same manner as the synthesis example 2 yielded a toluene solution of a resin 4 with a non-volatile fraction of 50% by mass (and with an average composition formula:

Synthesis Example 6

Synthesis of a Resin 5

In the synthesis example 2, with the exception of replacing the 38.6 g of the straight-chain segment with 19.3 g of a dimethylsiloxane containing a chlorine atom bonded to a silicon atom at both molecular chain terminals, represented by a structural formula shown below:

preparation in the same manner as the synthesis example 2 yielded a toluene solution of a resin 5 with a non-volatile fraction of 50% by mass (and with an average composition formula:

Examples 1 to 5, and Comparative Examples 1 and 2

—Preparation of Composition

Using the components and blend quantities shown in Table 1, each of the resins 1 through 5 (in the form of the toluene solutions prepared in the synthesis examples 2 through 6) was placed in a flask and heated to 120° C., and the toluene was then removed under a reduced pressure of no more than 10 mmHg. Subsequently, the temperature inside the flask was lowered to 90° C., and siloxanes 1 through 3 and a reaction retarder were added to form a mixture. To the thus formed mixture was added a toluene solution of a platinum catalyst containing divinyltetramethyldisiloxane ligands, in sufficient quantity to provide a quantity of platinum atoms (on a mass basis) of 20 ppm relative to the resin 1 through 5, and the resulting mixture was then stirred thoroughly. Subsequently, foam was removed from the composition under a state of reduced pressure. This completed preparation of the composition.

—Preparation of Test Specimen

Each of the prepared compositions was poured into a mold, and then cured by heating at 100° C. for 1 hour and then at 150° C. for a further 1 hour, thus completing preparation of a sheet-like cured product of thickness 2 mm.

Furthermore, a surface-mounted LED comprising an LED element that had undergone wire bonding were dried at 150° C. for 10 minutes inside a cup-shaped case of diameter 3 mm formed from a polyphthalamide, and the above composition was then poured into the case and cured by heating at 80° C. for 1 hour and then at 150° C. for a further 1 hour, thus completing preparation of a LED sealed sample.

—Test Methods

Using the sheet-like cured products and the LED sealed samples prepared in the manner described above, the following tests were conducted. The results are shown in Table 1.

1. Hardness: The hardness of the sheet-like cured product at 23° C. was measured using a Shore D hardness meter.

2. Light Transmittance: The sheet-like cured product of thickness 2 mm was mounted in a spectrophotometer, and the light transmittance of a direct light beam of wavelength 400 nm was measured.

3. Crack Test: The LED sealed sample was placed under degradation conditions (reflow conditions: heating at 260° C. for 3 minutes. Temperature cycling: a cycle involving heating at 100° C. for 30 minutes and cooling at −40° C. for 30 minutes was repeated either 5 times or 100 times). Subsequently, the existence of cracks within the LED sealed sample that had been subjected to degradation conditions was verified by inspection of the sample using an optical microscope at a 150-fold magnification. The specific evaluation criteria used are shown below.

A: no cracks were noticeable

B: small cracks were noticed around the bonding wires

C: large cracks were visible that traversed the surface of the cured product inside the cup-shaped case

TABLE 1

|  | Example 1 | Example 2 | Example 3 | Example 4 | Example 5 | Comparative example 1 | Comparative example 2 |
|---|---|---|---|---|---|---|---|
| (A) | | | | | | | |
| Resin 1 | 100 | 100 | — | — | — | — | — |
| Resin 2 | — | — | 100 | — | — | — | — |
| Resin 3 | — | — | — | 100 | 100 | — | — |
| Resin 4 | — | — | — | — | — | 100 | — |
| Resin 5 | — | — | — | — | — | — | 100 |
| (D) | | | | | | | |
| Siloxane 1 | 10 | 10 | 10 | 10 | 10 | 10 | 10 |
| (B) | | | | | | | |
| Siloxane 2 | — | 20 | 16 | 16 | — | 22 | — |
| Siloxane 3 | 8 | — | — | — | 6 | — | 12 |
| other | | | | | | | |
| Reaction retarder | 0.1 | 0.1 | 0.1 | 0.1 | 0.1 | 0.1 | 0.1 |
| H/Vi | 1.03 | 0.96 | 0.79 | 1.03 | 1.05 | 0.9 | 1.02 |
| Hardness (Shore D) | 66 | 58 | 73 | 70 | 73 | 68 | 71 |
| Light transmittance (400 nm) (%) | 88 | 87 | 85 | 88 | 87 | 87 | 75 |
| Cracks | | | | | | | |
| Initial | A | A | A | A | A | A | A |
| Reflow conditions | A | A | A | A | A | B | A |
| 5 temperature cycles | A | A | A | A | A | C | B |
| 100 temperature cycles | A | A | A | A | A | — | C |

(Units for blend quantities: parts by mass)

*The blend quantities for the resins 1 through 5 in the table do not include the toluene solvent
*The organohydrogenpolysiloxane of the component (B), the adhesion-imparting agent of the component (D), and the reaction retarder are as shown below.

Component (D)
Siloxane 1 (viscosity at 25° C.: 12 mPa·s)

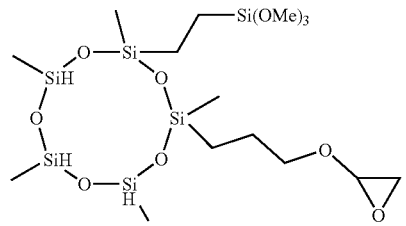

Component (B)
Siloxane 2 (viscosity at 25° C.: 25 mPa·s)

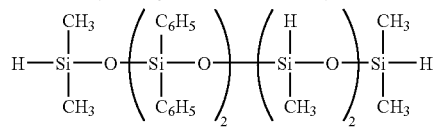

Component (B)
Siloxane 3 (viscosity at 25° C.: 0.9 mPa·s): tetramethyltetrahydrogencyclotetrasiloxane
Reaction retarder: ethynylcyclohexanol
*"H/Vi" represents the ratio (molar) of hydrogen atoms bonded to silicon atoms within the combination of the component (B) and component (D) relative to each 1 mol of vinyl groups bonded to silicon atoms within the component (A).
*The crack test for the comparative example 1 revealed large cracks after 5 temperature cycles (evaluation: C), and consequently an evaluation of the level of cracks after 100 temperature cycles was not conducted.

What is claimed is:

1. An addition reaction curing silicone composition, comprising:

(A) at least one organopolysiloxane in a liquid state with a viscosity at 25° C. of 10 mPa·s or greater or in a solid state, which is represented by an average composition formula (1):

$$R^1_n SiZ_{(4-n)/2} \quad (1),$$

wherein, each $R^1$ represents, independently, an unsubstituted or substituted monovalent hydrocarbon group, an alkoxy group or a hydroxyl group, provided that from 5 to 50 mol % of all $R^1$ groups are alkenyl groups, and from 10 to 80 mol % of all $R^1$ groups are aryl groups, Z represents an oxygen atom or a bivalent hydrocarbon group of 2 to 10 carbon atoms, provided at least 80 mol % of all Z groups are oxygen atoms, and n is a number that satisfies $1 \leq n < 2$, and in which from 5 to 50 mol % of all silicon atoms exist within at least one structure selected from the group consisting of

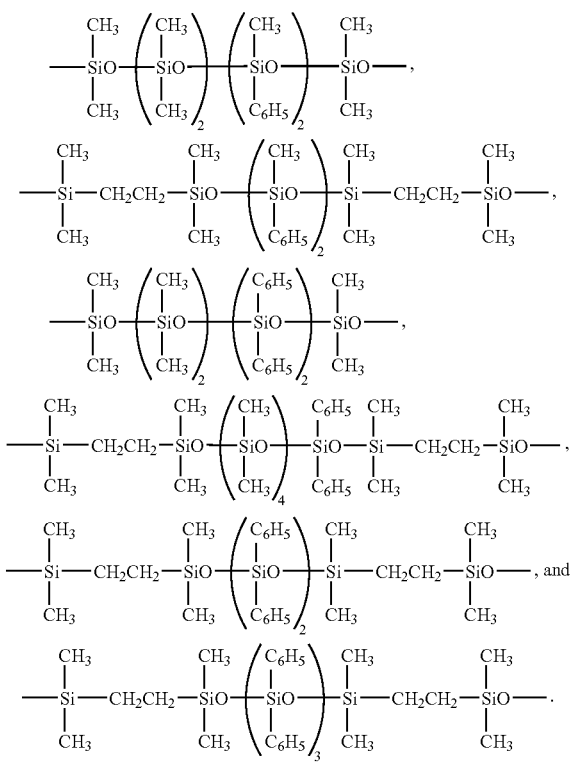

(B) at least one organohydrogenpolysiloxane having at least 2 hydrogen atoms bonded to silicon atoms within each molecule and with a viscosity at 25° C. of no more than 1,000 mPa·s, represented by an average composition formula (3):

$$R^3{}_a H_b SiO_{[(4-a-b)/2]} \quad (3),$$

wherein, each $R^3$ represents, independently, an unsubstituted or substituted monovalent hydrocarbon group that contains no aliphatic unsaturated bonds, a is a number that satisfies $0.7 \leq a \leq 2.1$, and b is a number that satisfies $0.001 \leq b \leq 1.0$, provided that a+b represents a number that satisfies $0.8 \leq a+b \leq 3$, present in sufficient quantity to provide from 0.7 to 5 mols of hydrogen atoms bonded to silicon atoms within component (B) for every 1 mol of alkenyl groups bonded to silicon atoms within said component (A), and (C) an effective quantity of at least one addition reaction catalyst.

2. The composition according to claim 1, further comprising (D) at least one adhesion-imparting agent.

3. The composition according to claim 1, wherein said component (A) is at least one compound selected from the group consisting of:

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.07}[(C_6H_5)_2SiO_{2/2}]_{0.07}[(CH_3)_2SiO_{2/2}]_{0.06}$;

$[(C_6H_5)SiO_{3/2}]_{0.6}[(CH_2=CH)(CH_3)_2SiO_{1/2}]_{0.1}[(CH_3)_2SiO_{1/2}(C_2H_4)_{1/2}]_{0.1}[(C_6H_5)_2SiO_{2/2}]_{0.1}[(CH_3)_2SiO_{2/2}]_{0.1}$;

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.04}[(C_6H_5)_2SiO_{2/2}]_{0.02}[(CH_3)_2SiO_{2/2}]_{0.14}$;

$[(C_6H_5)SiO_{3/2}]_{0.6}[(CH_2=CH)(CH_3)_2SiO_{1/2}]_{0.2}[(CH_3)_2SiO_{1/2}(C_2H_4)_{1/2}]_{0.08}[(C_6H_5)_2SiO_{2/2}]_{0.04}[(CH_3)_2SiO_{2/2}]_{0.08}$; and $[(C_6H_5)SiO_{3/2}]_{0.6}[(CH_2=CH)(CH_3)_2SiO_{1/2}]_{0.2}[(C_6H_5)_2SiO_{2/2}]_{0.07}[(CH_3)_2SiO_{2/2}]_{0.13}$, (wherein, within each of the compounds, $(C_2H_4)$ represents a $-CH_2CH_2-$ group.

4. The composition according to claim 1, wherein from 5 to 40 mol % of all $R^1$ groups are alkenyl groups; from 25 to 70 mol % of all $R^1$ groups are aryl groups; and from 90 to 100 mol % of all Z groups are oxygen atoms.

5. The composition according to claim 1, wherein from 10 to 30 mol % of all $R^1$ groups are alkenyl groups; from 30 to 60 mol % of all $R^1$ groups are aryl groups; and from 95 to 99.9 mol % of all Z groups are oxygen atoms.

6. The composition according to claim 1, wherein the bivalent hydrocarbon group represented by Z is at least one member selected from the group consisting of an ethylene group, a propylene group, a phenylene group, and a cyclohexylene group.

7. The composition according to claim 1, wherein at least one $R^1$ group is selected from the group consisting of a methyl group, an ethyl group, a cyclohexyl group, a norbornyl group, a vinyl group, a phenyl group, a trifluoropropyl group, a methoxy group, and an ethoxy group.

8. The composition according to claim 1, wherein $R^3$ is at least one selected from the group consisting of a methyl group, an ethyl group, a propyl group, a butyl group, a pentyl group, a hexyl group, a cyclohexyl group, a norbornyl group, a phenyl group, a trifluoropropyl group, a glycidylpropyl group, and a trimethoxysilylethyl group.

9. The composition according to claim 1, wherein (B) is at least one selected from the group consisting of 1,1,3,3-tetramethyldisiloxane, tris(dimethylhydrogen-siloxy)methylsilane, tris(dimethylhydrogensiloxy)phenylsilane, tetramethyltetrahydrogen-cyclotetrasiloxane, $Me_3SiO(SiMeHO)_d SiMe_3$, $Me_3SiO(SiMeHO)_d(SiMe_2O)_e SiMe_3$, $Me_3SiO(SiMeHO)_d(SiPh_2O)_e SiMe_3$, $Me_3SiO(SiMeHO)_d(SiPhMeO)_e SiMe_3$, $Me_3SiO(SiMeHO)_d(SiMe_2O)_e(SiPh_2O)_f SiMe_3$, $HMe_2SiO(SiMeHO)_d SiMe_2H$, $HMe_2SiO(SiMeHO)_d(SiMe_2O)_e SiMe_2H$, $HMe_2SiO(SiMeHO)_d(SiPh_2O)_e SiMe_2H$, $HMe_2SiO(SiMeHO)_d(SiMe_2O)_e(SiPh_2O)_f SiMe_2H$, and a branched siloxane compound of one of the above straight-chained compounds substituted with at least one of a $MeSiO_{3/2}$ unit, a $PhSiO_{3/2}$ unit or a $SiO_{4/2}$ unit, wherein, d represents an integer from 2 to 20, e represents an integer from 0 to 20, f represents an integer from 0 to 20, Me represents a methyl group, and Ph represents a phenyl group.

10. The composition according to claim 1, wherein (C) comprises at least one metal selected from the group consisting of platinum, palladium, and rhodium.

11. The composition according to claim 1, wherein (C) is present in an amount ranging from 0.1 to 500 ppm.

12. The composition according to claim 2, wherein (D) is at least one selected from the group consisting of

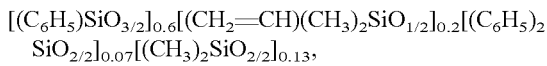

-continued

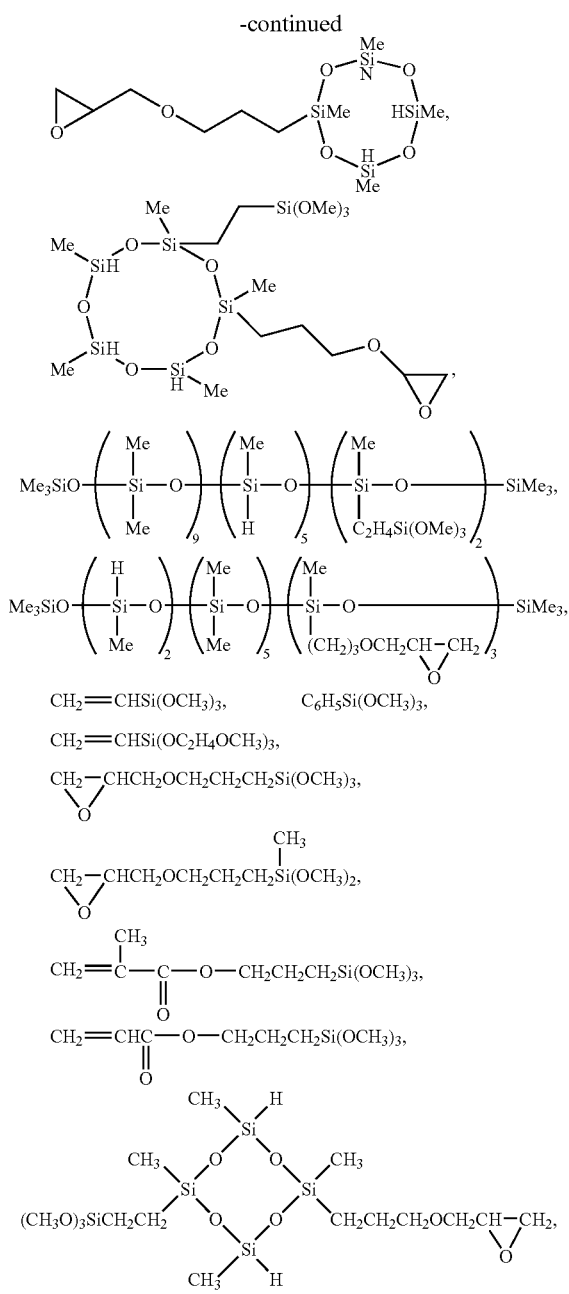

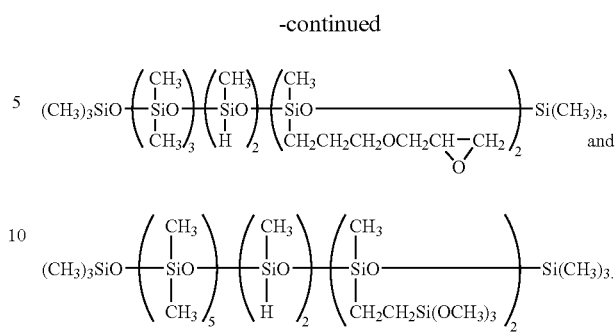

and

13. The composition according to claim 1, further comprising at least one of ethynylcyclohexanol; a carbon functional silanes containing an epoxy group, a carbon functional silanes containing an alkoxysilyl group, a partial hydrolysis-condensation product of a carbon functional silanes containing an epoxy group, a partial hydrolysis-condensation product of a carbon functional silanes containing an alkoxysilyl group, a siloxane compound, a fumed silica, a fumed silica containing a polyether, silver powder, copper powder, aluminum powder, carbon, a dye, or a pigment.

14. A cured product obtained by curing the composition according to claim 1.

15. The cured product according to claim 14, wherein transmittance of light of wavelength 400 nm through said cured product in the form of a sheet with a thickness of 2 mm is 80% or higher.

16. A sealing material comprising the composition according to claim 1.

17. An adhesive comprising the composition according to claim 1.

18. A process for sealing a photodevice with a cured product of the sealing material according to claim 16, comprising:
applying said sealing material to said photodevice and
curing said sealing material to form said cured product on said photodevice.

19. A process for bonding two adherends with a cured product of the adhesive according to claim 17, comprising:
sandwiching said adhesive between said adherends, and
curing said adhesive to form said cured product between said adherends.

* * * * *